United States Patent [19]

Pelly

[11] 3,725,768
[45] Apr. 3, 1973

[54] CURRENT FED INVERTER CIRCUIT USING THE TIME SHARING PRINCIPLE

[75] Inventor: Brian R. Pelly, Murrysville, Pa.

[73] Assignee: Westinghouse Electric Corporation, Pittsburgh, Pa.

[22] Filed: June 7, 1971

[21] Appl. No.: 150,574

[52] U.S. Cl. .................... 321/6, 321/27 R, 321/45 R
[51] Int. Cl. ............................................. H02m 7/52
[58] Field of Search ............ 321/6, 27 R, 45 R, 45 C; 219/10.77

[56] References Cited

UNITED STATES PATENTS

| | | |
|---|---|---|
| 3,506,907 | 4/1970 | Porterfield et al. .................. 321/45 R |
| 3,475,674 | 10/1969 | Porterfield et al. .................. 321/45 R |
| 3,328,596 | 6/1967 | Germann et al. .................... 321/45 R |

FOREIGN PATENTS OR APPLICATIONS

| | | |
|---|---|---|
| 1,136,376 | 12/1968 | Great Britain ...................... 321/45 R |
| 1,051,872 | 12/1966 | Great Britain ...................... 321/45 R |

Primary Examiner—William H. Beha, Jr.
Attorney—F. H. Henson, C. F. Renz and M. P. Lynch

[57] ABSTRACT

A current fed inverter circuit operating in a time-sharing mode to supply A.C. output voltage to a load from a D.C. voltage source. Typically the load may be inductive, for example, an induction heating work coil, in which case a capacitor is connected across it to correct the power factor. So-called "time-sharing" capacitors are connected in series between the solid state switching devices of the inverter circuit, which are typically thyristors, and the electrical load. Under all output voltage conditions up to and including the preferred full load voltage operating condition the phase displacement between the output voltage and output current is such that the current always lags the voltage thus establishing a lagging phase angle operation. The time-sharing capacitors under ideal conditions are dimensioned such that with the full load current flowing at the output of the inverter circuit, the peak voltage developed across each time-sharing capacitor is approximately equal to the peak load voltage at the normal output frequency.

6 Claims, 13 Drawing Figures

COMPONENT $U_{(a)}$ DUE TO VOLTAGE ACROSS "TIME-SHARING" CAPACITORS $V_C$ = PEAK VOLTAGE DEVELOPED ACROSS EACH "TIME-SHARING" CAPACITOR

COMPONENT $U_{(G)}$ DUE TO LOAD VOLTAGE $V_O$ = PEAK LOAD VOLTAGE

NET VOLTAGE ACROSS THYRISTOR $U_{(G)} + U_{(G)}$

3,725,768

CURRENT FED INVERTER CIRCUIT USING THE TIME SHARING PRINCIPLE

BACKGROUND OF THE INVENTION

The use of thyristor inverters to provide high-frequency power for applications, such as induction heating, is both technically and economically attractive. Unfortunately the dynamic switching characteristics, i.e., the turn off time, of presently available high power thyristors as used in the conventional converter circuits are not readily compatible with the economical generation of power levels of 100 kilowatts and higher at frequencies of 10 kilohertz and higher.

The time sharing mode of operation of inverter circuit, in which several thyristor sub-circuits are operated sequentially into a common load circuit, so that the fundamental frequency of operation of each of the thyristors is a sub-multiple of the output frequency, offers a solution to the major difficulty of providing sufficient turn-off time for the thyristors in a high-frequency inverter circuit. The time-sharing mode of operation provides for optimum utilization of the thyristors, due to the relatively long thyristor conduction periods and relatively slow repetition frequency.

A time-sharing mode of operation as described in the prior art is utilized exclusively with a "voltage-fed" type of inverter circuit. This type of inverter circuit is characterized by the presence of an essentially smooth, low-impedance, D.C. voltage source at its input terminals. Half-sinusoid of current are drawn from this D.C. voltage source as a result of switching the thyristors into a "ringing" L-C circuit combination. The time-sharing mode of operation of the voltage fed inverter circuit includes inductors and capacitors connected in series between the thyristors and the load circuit. On, alternatively, for induction, heating applications, the main part of the series inductance may comprise the load coil itself. The voltage developed across the individual series capacitors at the end of the associated thyristor conduction period is retained until the next conduction period of the thyristor. The stored capacitor voltage provides a reverse voltage bias for the outgoing thyristor, for a relatively long period of time, thereby essentially eliminating the turn-off problem. For high power induction heating application, the voltage fed type of inverter has several practical disadvantages. For example, if the circuit is arranged so that the ringing inductor is the load coil itself, the inverter is required to deliver the full current of the load coil, but only at a fraction of the load voltage. This high current requirement of the inverter results in inconveniently large and expensive bus work. Moreover, with this type of circuit, the occurrence of short circuits across the load results in excessive voltages being reflected back across the inverter; and commutation failures result in potentially dangerous fault currents in the thyristors. The disadvantages of voltage fed type inverter circuits are overcome by the current fed type of inverter circuit which is characterized by the presence of an essentially infinite smoothing inductor connected in series with the D.C. voltage source. This inductor delivers a substantially smooth supply of direct current to the inverter input terminals. This current is alternately switched by the inverter thyristors in opposite directions through the load circuit. The total output circuit is arranged to appear capacitive, and thus it is insured that the polarity of the voltage at the inverter output terminals is in the appropriate direction to commutate the current. The implementation of the current fed inverter circuit to operate in the time-sharing mode of operation permits the use of conventional thyristors in an inverter circuit to provide high frequency, high power load requirements.

SUMMARY OF THE INVENTION

A current fed inverter circuit including a capacitor connected in shunting relationship across the load to provide a path for high order harmonics of the generally square output current inverter waveform is adapted for operation in the time-sharing mode of operation by adding time-sharing capacitors in series between the thyristor sub-circuits of the inverter circuit and the electrical load. The tuned load circuit resulting from the connection of the capacitor in shunting relationship with the typically inductive load, results in a load circuit exhibiting a lagging phase angle wherein the load current lags the load voltage. The time-sharing capacitors which are connected in series between the thyristor sub-modules and the load circuit are dimensioned so that with the full load current flowing at the output of the inverter circuit, the peak voltage developed across each time-sharing capacitor is approximately equal to the peak load voltage at the normal output frequency. This mode of operation of the time sharing current fed inverter differs from the conventional current inverter even with the inclusion of series capacitors in that the parallel tuned load circuit of the typical current fed inverter circuit operates at a leading phase angle.

DESCRIPTION OF THE DRAWINGS

The invention becomes more readily apparent from the following exemplary description in connection with the accompanying drawings.

DESCRIPTION OF THE PREFERRED EMBODIMENT

Figure 1:
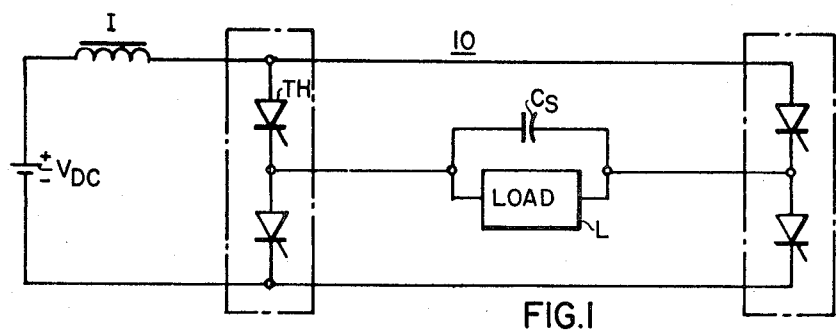
FIG. 1 is a basic schematic illustration of a current fed inverter circuit.

Referring to FIG. 1 there is illustrated an inverter circuit 10 comprising gate controlled thyristors TH operatively connected between a D.C. voltage source $V_{DC}$ and an inductive load L for sequentially supplying current first in one direction through load L and then in the opposite direction through load L to develop a desired A.C. load voltage. Inverter circuit 10 is arranged for operation in a current fed mode with a load shunting capacitor $C_S$ connected in parallel with the inductive load L. A typical inductive load would be that represented by an induction heater. The inductor I connected in series with the D.C. voltage source $V_{DC}$ delivers a substantially smooth supply of direct current to the inverter circuit 10. The load circuit which is comprised of inductive load L and shunting capacitor $C_S$ is arranged to appear capacitive, and thus it is insured that the polarity of the load voltage is in the appropriate direction to commutate the current. In this typical representation of a current fed inverter supplying an inductive load, the shunt capacitor $C_S$ provides a path for the higher order harmonics of the square output current waveform of the inverter 10 and also serves as a commutating capacitor.

Figure 2:
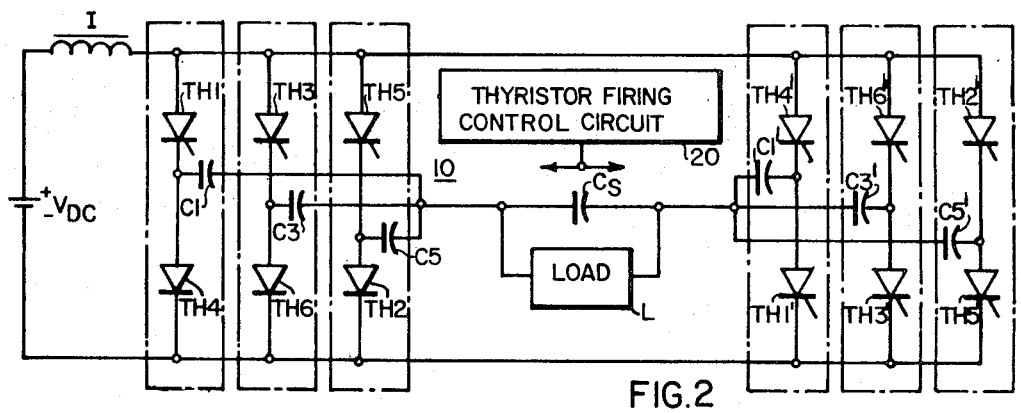
FIG. 2 is a basic schematic illustration of a current fed inverter circuit operating in the time-sharing mode.

In FIG. 2 there is schematically illustrated a modification of the basic current fed inverter circuit of FIG. 1 for operation in a time-sharing mode. Thyristor firing control circuit 20 sequentially controls the gating subcircuit combinations of the thyristors (TH1–TH1', TH2–TH2', . . .) to alternately supply in opposite direction through the parallel connected load circuit $C_S$ and L the D.C. current developed by the smoothing inductor I which is connected in series with the D.C. voltage source $V_{DC}$. In addition to the shunting capacitor $C_S$, which is connected across inductive load L, there is included time-sharing capacitors C1, C3, C5 and C1', C3', and C5' connected in series between the subcircuits and the L-C load circuit combination comprised of the shunting capacitor $C_S$ and the inductive load L. The function of the time sharing capacitor is to store a voltage which appears in the reverse direction across the outgoing thyristors, thus maintaining a net reverse bias across the thyristors for a sufficient time to ensure turn off, in spite of the relatively high frequency voltage oscillators across the load.

For the purposes of describing the operation of the current fed circuit of FIG. 2 and the time-sharing mode, the Q factor of the L-C load combination is assumed to be sufficiently high so as to develop a substantially sinusoidal voltage across the load combination. For the purposes of discussion, it is further assumed that there is no inductance connected in the path of the load current anywhere within the inverter circuit, nor in the external connections to the load circuit. This assumption leads to a "pure" rectangular load current waveform. In practice, such a current waveform, with its theoretically infinite $di/dt$, is not tolerable for the thyristors, and the square edges are removed by the means of suitable series connected inductance (not shown). The addition of such inductance does not detract from the basic principle of operation of the inverter circuit in FIG. 2 in time-sharing mode.

The waveforms illustrated in FIGS. 3A–3G illustrate the operation of a current fed inverter circuit of FIG. 2 in a time-sharing mode under the preferred full load operating condition. The following criteria are essential features for the full load operating condition of the inverter circuit of FIG. 2:

1. The phase displacement between the zero-crossing of the voltage and current of the L-C load circuit is about 30° with the current lagging the voltage.

2. The time-sharing capacitors are dimensioned so that with the full load current flowing, the peak voltage developed across each time-sharing capacitor is approximately equal to the peak load voltage at the normal output frequency.

Figure 3:
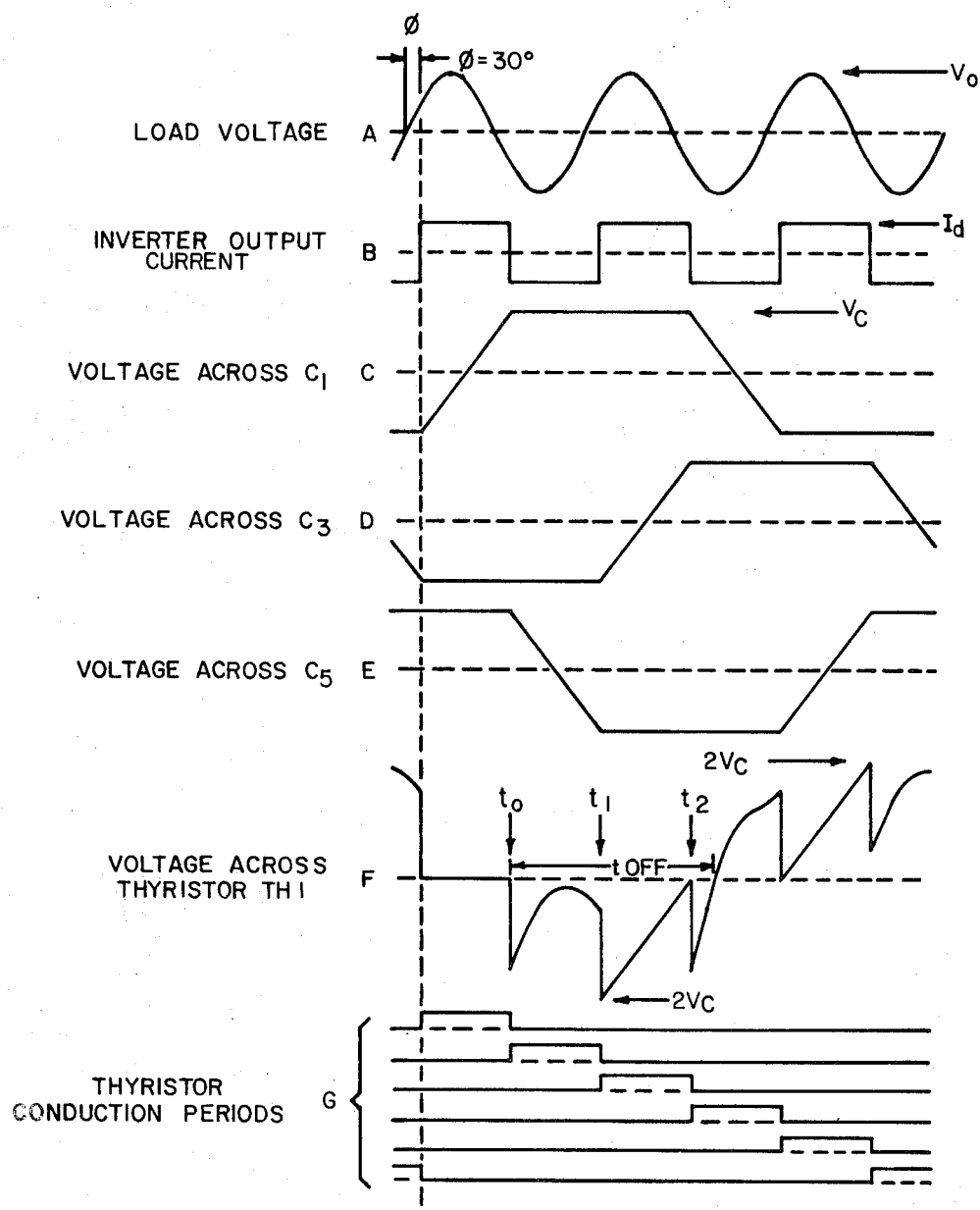
FIGS. 3A–3G are waveform illustrations of full load operation of the inverter circuit of FIG. 2.
Figure 5:
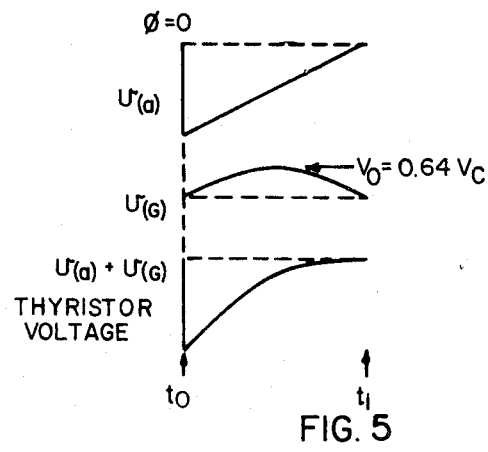
FIGS. 5–10 illustrate the synthesis of thyristor voltage waveforms during the period $t_0 - t_1$ for various load phase angles.
Figure 6:
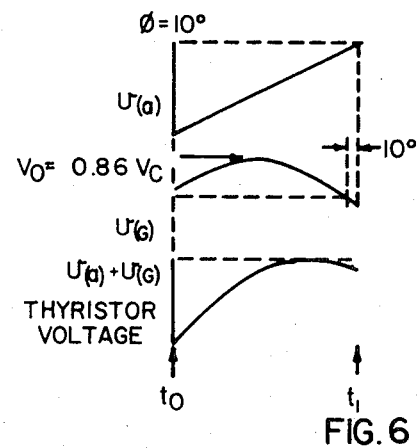
Figure 7:
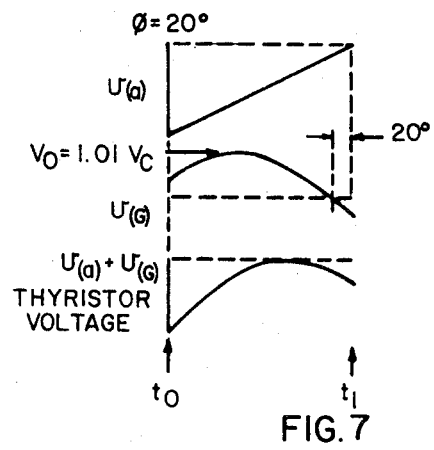
Figure 8:
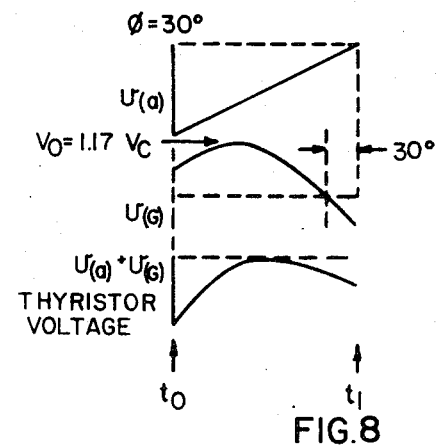
Figure 9:
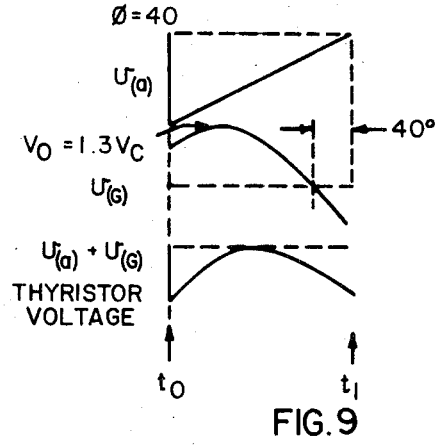
Figure 10:
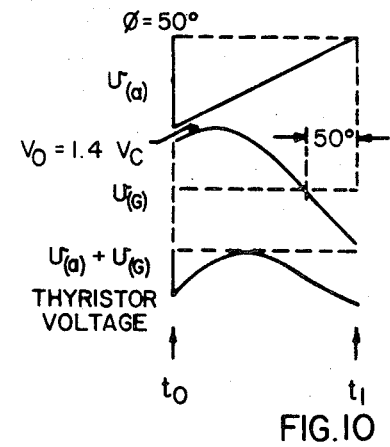

Having established the above two criteria, and the thyristor conduction sequences indicated in FIG. 3G, the waveforms of FIGS. 3A–3G illustrating full load operation of the current fed inverter circuit of FIG. 2 in a time-sharing mode. It is apparent from these waveforms that the total theoretical recovery time afforded to the thyristors ($t_{OFF}$) is slightly in excess of the period of the output frequency. In practice, however, due to the effect of series-connected inductance, this recovery time is slightly less than one period of the output frequency. Detailed consideration of the synthesis of the thyristor voltage waveform of FIG. 3F, in the time period $t_0 - t_1$, determines the above noted criteria. These criteria, in particular the operation of the L-C load combination at a lagging phase angle are vital to the economical operation of the current-fed inverter circuit in a time-sharing mode.

Inasmuch as full load operating conditions are of prime importance, the following discussion of the operation of the current-fed circuit of FIG. 2 will be directed to operating under full load conditions.

Figure 4:
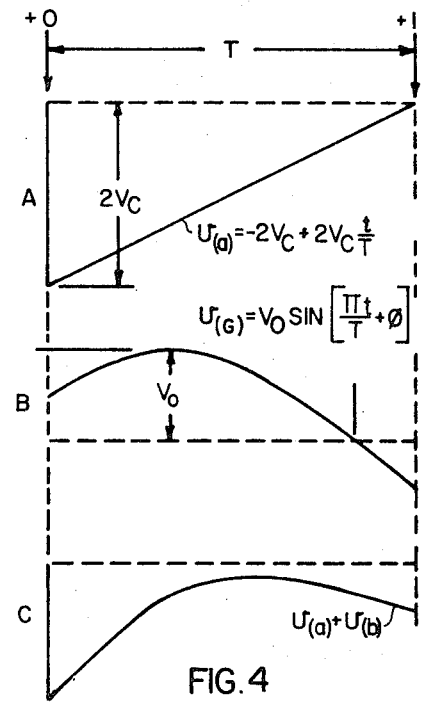
FIGS. 4A–4C illustrate thyristor voltage waveform during the time period $t_0 - t_1$.

As illustrated in FIGS. 4A–4C, the thyristor voltage waveform during the period $t_0 - t_1$ can be considered to be made up of two components. The first component $v_0$, illustrated in FIG. 4A, corresponds to the voltages developed on the two appropriate time-sharing capacitors associated with each thyristor (for thyristor TH1 these capacitors correspond to capacitors C1 and C5'. This component is a positive going linear ramp waveform, having an initial value of $-2V_C$, where $V_C =$ the peak voltage developed across each time-sharing capacitor, and a final value of zero at $t_1$. The second voltage component $V_b$ illustrated in FIG. 4B corresponds to the load voltage, and is part of a sinusoid.

Assume for the purpose of discussion that the above-identified criteria have not yet been established. If the benefits of the relatively long thyristor turn-off time afforded by the circuit are to be realized, and the net sum of the voltage components of FIGS. 4A and 4B must remain negative throughout the period $t_0 - t_1$. The phase angle $\phi$ of the zero crossing of the load voltage with respect to $t_0$, as illustrated in FIG. 3A, which corresponds to the angular displacement between the output voltage and current waveforms of the inverter circuit can in general have any value within reasonable limits. For the circuit operation under consideration, however, it is necessary to determine the value of $\phi$ and the corresponding peak value of the output voltage, relative to the peak voltage developed across the time-sharing capacitors which will permit optimum utilization of the inverter circuit without violating the condition of maintaining a net negative thyristor voltage throughout the time period $t_0 - t_1$. In order to satisfy these requirements it is necessary to recognize that the peak voltage seen by the thyristors in the inverter circuit is invariably $2V_C$, regardless of the phase angle of the load circuit, or the amplitude of the load voltage $V_0$. This peak voltage appears across the thyristor at a point in time outside the time period $t_0 - t_1$ as illustrated in FIG. 3F. Thus for thyristors of a given voltage rating, $V_c$ is established according to the relationship $V_c =$ ($V_{TH}/2a) \times k$, where $k$ is some suitable safety factor less than 1, and there remains the determination of the optimum combination of $\phi$ and load voltage $V_0$ relative to the time-sharing capacitor peak voltage $V_C$.

The waveforms of FIGS. 5–10 illustrate various combinations of load phase angle $\phi$ and relative peak load voltage $V_0$. For each phase angle $\phi$, the peak load voltage $V_0$ is chosen to be the critical value which just insures a net negative thyristor voltage throughout the period $t_1 - t_2$. It is apparent that the critical peak value of the load voltage $V_0$ steadily increases as the load phase angle $\phi$ is increased in a lagging direction. Conversely the load voltage $V_0$ steadily decreases as the load phase angle $\phi$ is increased in a leading direction.

For each of the waveform conditions illustrated in FIGS. 5–10, the power output of the inverter circuit is directly proportional to the product of the peak load voltage and the cosine of the load phase angle. For all conditions, the load current waveform has the same shape and amplitude providing thyristors of a given current handling capability are utilized. It can be calculated that the maximum value of the product of the critical peak load voltage and the cosine of the load phase angle occurs when $\phi$ is approximately 30°. The corresponding critical value of load voltage $V_0$ is approximately 1.17 times the peak voltage across the time-sharing capacitor. These, then, are the theoretical optimum full load operating criteria. In practice, however, the peak load voltage should be slightly less than the theoretical critical value in order to allow some margin of safety. Therefore, a suitable practical relationship can be expressed as $V_0 = 1.0 \times V_C$.

Figure 11:
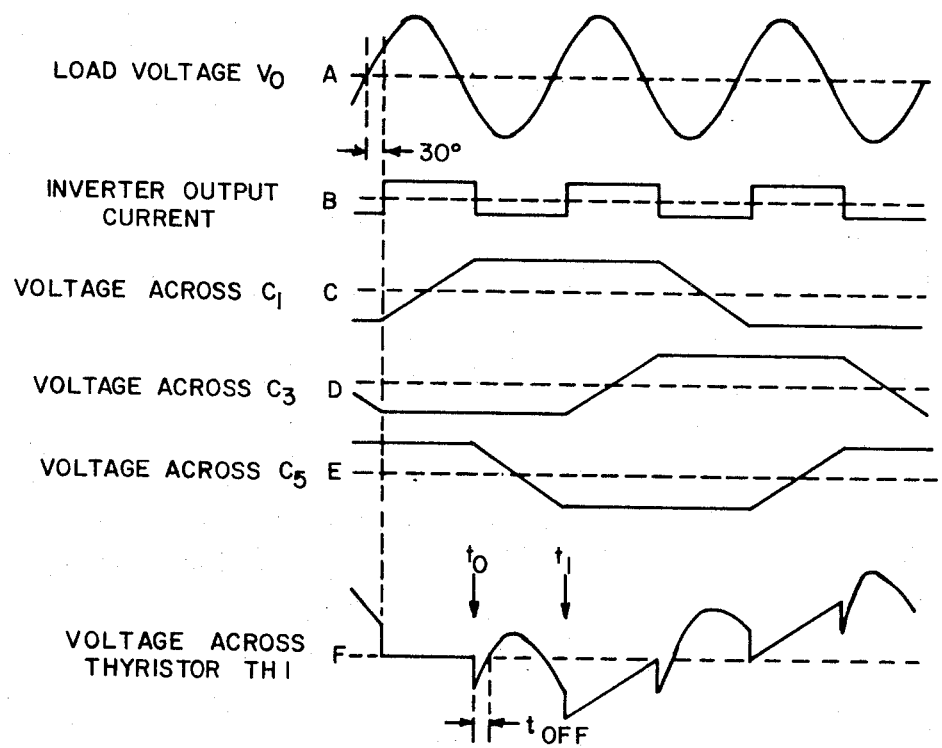
FIGS. 11A–11F are waveforms illustrating half-load operating condition of the inverter circuit of FIG. 2 with a lagging phase angle of 30°.

Thus far only the full load operating conditions of the inverter circuit of FIG. 2 have been considered. There is a potential problem for operation at less than full load. This can be illustrated by considering the situation when the power and reactive component of the load simultaneously decrease. In FIGS. 11A–11F there are illustrated hypothetical waveforms corresponding to the operation of the inverter circuit of FIG. 2 at half maximum load. It is assumed that the phase angle of the output current is maintained at 30° with respect to the load voltage. Since the phase angle of the load remains fixed, the amplitude of the inverter output current decreases in proportion to the decrease in load while the D.C. voltage provided at the input of the inverter by the D.C. voltage source $V_{DC}$ maintains the same value as under full load conditions. Due to the reduced amplitude of the output current as illustrated in FIG. 11B, the peak voltage developed across the time-sharing capacitors as illustrated in FIGS. 11C, 11D and 11E decreases accordingly. It is apparent that this voltage is no longer sufficient to counteract the low voltage waveform during the critical time period $t_0 - t_1$. The result is that the voltage across the outgoing thyristor TH1, as illustrated in FIG. 11F swings into the forward direction during this critical period, and the turn-off time afforded to the thyristor is drastically reduced. Clearly, this operating mode is unacceptable, since the benefits of the relatively large turn-off time, obtained at full load, are sacrificed at reduced load.

Consideration of this problem shows that in order to maintain the desired turn-off time for the thyristors, the basic requirement is to maintain a sufficient voltage across the time sharing capacitors to counteract the load voltage waveform. This can be accomplished by maintaining at least a minimum amplitude of current at the output of the inverter circuit, as the power component of the load decreases. This minimum amplitude current can be developed by retarding the phase angle of the output current of the inverter circuit with respect to the output voltage, i.e. by retarding the thyristor firing angle, as the power component of the load decreases. For a given parallel L-C load circuit, this results in a reduced output frequency with decreasing load. However, for a high Q load, such as is the case in an induction heating application, this frequency shift is relatively small and is of no practical consequence.

Figure 12:
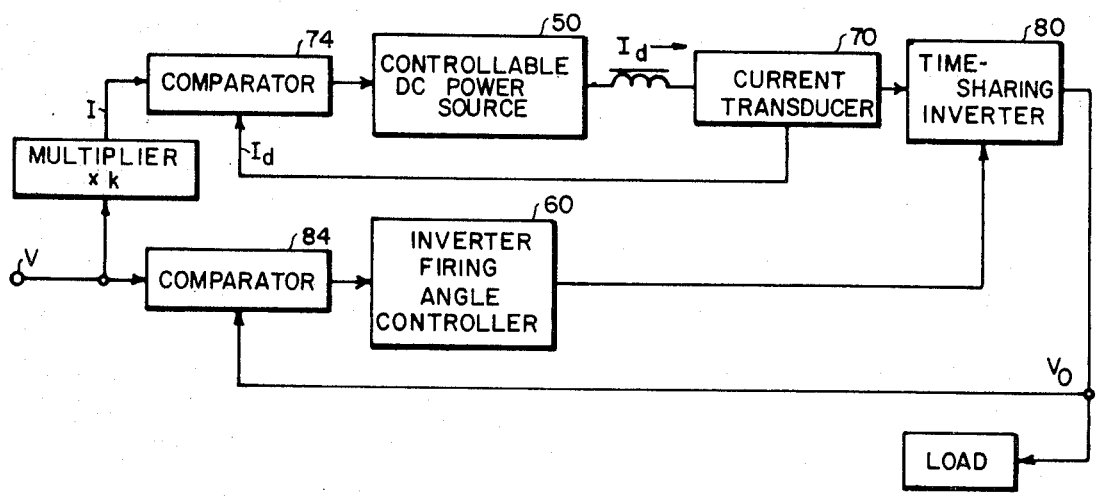
FIG. 12 is a block diagram schematic illustration of a control scheme in connection with the inverter of FIG. 2.
Figure 13:
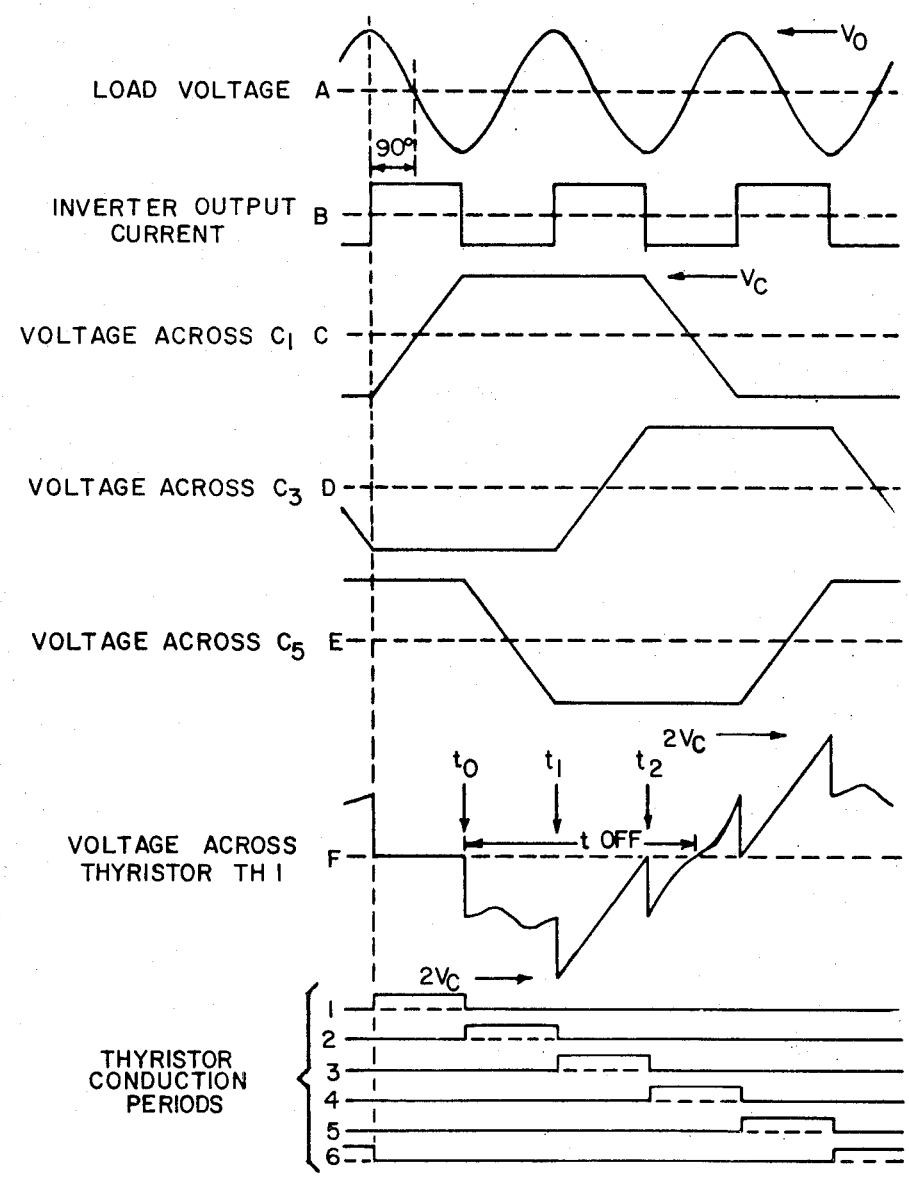
FIGS. 13A–13G are waveforms illustrating no-load operation of the inverter circuit of FIG. 2.

Referring to FIG. 12 there is illustrated by way of example in block diagram form one possible control circuit 30 for providing adequate turn-off time for the thyristors of the inverter circuit 10 at all loads. A fixed level of input current of the inverter, appropriate to the desired output voltage level, is maintained, regardless of the output loading of the inverter circuit 10. At the same time, the output voltage is regulated to the desired level by controlling the firing angle of the inverter between the full load limit of 30° and no-load limit of 90° lagging. The control provided by the circuit 30 for full load operating conditions corresponds to the operation of waveforms as illustrated in FIGS. 3A–3G. Under no-load operating conditions, with full output voltage, the operation of the inverter circuit 10 of FIG. 12 is illustrated in the waveforms of FIGS. 11A–11G. It is apparent from these waveforms that the full thyristor turnoff time is maintained regardless of the loading at the output of the inverter circuit 10.

The controllable D.C. power source might typically consist of a conventional phase controlled thyristor rectifier 50 together with firing angle control circuitry 60 fed from a three phase 60 hertz source. The D.C. output voltage $D_d$ of such an arrangement can be continuously varied by controlling the amplitude of the low level analog input signal $v_1$. A signal directly proportional to the output current of the controllable D.C. power source 50 is developed by current transducer 70 and said fed back to the comparator circuit 74 where it is compared with a current reference value I. Thus the action of the control loop is such that the current $I_d$ is directly proportional to the reference current I, and for any given inverter output voltage reference value V, a proportional level of inverter input current is prescribed.

The function of the inverter firing angle control circuit 60 is to control the firing angle of the time-sharing inverter circuit 80 with respect to load voltage between the limits of 90° and 30° lagging in response to a low level input signal $e_1$. The output voltage $V_0$ of the inverter is supplied as an input to comparator circuit 84 where it is compared with the output voltage reference signal V. The difference between these two signals is applied as the input signal $e_1$ to the inverter firing angle control circuit 60.

In order to illustrate the operation of the overall system, assume for example that the output voltage reference V is set to the normal maximum value. Then the prescribed level of current $I_d$ will correspond to the normal rate of full load current of the inverter, and this level of current will invariably flow into the inverter, regardless of the load at the output of the inverter so long as the reference voltage $V$ remains unaltered. If there is a light power component of the load at the output of the inverter, then the voltage control loop will automatically adjust the inverter firing angle to approximately 90° so that the relatively small in phase component of current thereby obtained is just sufficient to maintain the prescribed voltage level across the load. The action of this control loop can be understood further by assuming a condition wherein the power component of the load increases. Since the amplitude of the inverter input current does not change, the tendency will be for the inverter output voltage to decrease if the firing angle is maintained at approximately 90°. This will result in an increasing error signal $e_1$ at the input of the inverter firing angle control circuit 60. This will advance the firing angle $\phi$, bringing the output current more into phase with the output voltage, thus satisfying the increase load demand and re-establish the prescribed voltage across the load.

This simple control scheme is shown only by way of example. It is not essential to keep the amplitude of the inverter current precisely constant with changing load condition; all that is required is to maintain a sufficient level of current so that the thyristor always remains in reverse bias condition during the time period $t_0 - t_1$.

I claim as my invention:

1. A power inverter apparatus operatively connected between a D.C. input voltage source and output circuit to supply an A.C. output voltage to said output circuit, comprising, an inverter power stage, means operatively connected between said D.C. input voltage source and said inverter power stage to supply substantially smooth direct current to said inverter power stage, said inverter power stage including a plurality of ON-OFF conduction controlled power switching devices for developing a continuous output current flow in alternate directions through said output circuit in response to a prescribed sequence of power switching device firing signals, control circuit means for generating said sequence of firing signals to operate each of said power switching devices at a fundamental frequency of operation which is a sub-multiple of the frequency of said A.C. output voltage, and time-sharing capacitors operatively connected in series between said power switching devices and said output circuit, said time-sharing capacitors maintaining a reverse bias across each power switching device following conduction thereof for a period of time sufficient to insure turn off of each of said power switching devices.

2. A power inverter apparatus as claimed in claim 1 wherein said output circuit means includes an electrical load which is substantially inductive to the fundamental frequency of said A.C. output voltage and exhibits a relatively low impedance to high order harmonics of said output current.

3. A power inverter apparatus as claimed in claim 2 wherein said output circuit means includes a shunting capacitor connected in parallel across said electrical load.

4. A power inverter apparatus as claimed in claim 1 wherein said time sharing capacitors are dimensioned such that the output current flow under full load conditions results in a peak voltage developed across each time sharing capacitor which corresponds substantially to the peak voltage developed across said output circuit.

5. A power inverter apparatus as claimed in claim 1 wherein said means for supplying substantially smooth direct current to said inverter power stage includes a current smoothing inductor.

6. A power inverter apparatus operatively connected between a D.C. input voltage source and an output circuit to supply an A.C. output voltage to said output circuit, comprising, an inverter power stage, inductor means operatively connected between said D.C. input voltage source and said inverter power stage to supply substantially smooth direct current to said inverter power stage, said inverter power stage including a plurality of ON-OFF conduction controlled power switching devices for developing a continuous output current flow in alternate directions through said output circuit in response to a prescribed sequence of power switching device firing signals, wherein said output circuit means includes an electrical load which is substantially inductive to the fundamental frequency of said A.C. output voltage and exhibits a relatively low impedance to high order harmonics of said input current, control circuit means for generating said sequence of firing signals to operate each of said power switching devices at a fundamental frequency of operation which is a submultiple of the frequency of said A.C. output voltage, and time sharing capacitors operatively connected in series between said power switching devices and said output circuit, said time sharing capacitors maintaining a reverse bias across each power switching device following conduction thereof for a period of time sufficient to insure turn-off of each of said power switching devices, wherein said control circuit means includes a firing angle control circuit means for adjusting the firing angle of said power switching devices in response to variations in said electrical load to maintain an essentially constant turn off time for said power switching devices.

* * * * *